United States Patent
Smyrniotis et al.

(10) Patent No.: US 8,916,120 B2
(45) Date of Patent: *Dec. 23, 2014

(54) DRY PROCESSES, APPARATUS, COMPOSITIONS AND SYSTEMS FOR REDUCING SULFUR OXIDES AND HCl

(71) Applicant: Fuel Tech, Inc., Warrenville, IL (US)

(72) Inventors: Christopher R. Smyrniotis, St. Charles, IL (US); Kent W. Schulz, Geneva, IL (US); Emelito P. Rivera, Inverness, IL (US); Mingming Fang, Naperville, IL (US); Ian Saratovsky, Highland Park, IL (US)

(73) Assignee: Fuel Tech, Inc., Warrenville, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/854,361

(22) Filed: Apr. 1, 2013

(65) Prior Publication Data

US 2013/0336868 A1 Dec. 19, 2013

Related U.S. Application Data

(60) Provisional application No. 61/618,233, filed on Mar. 30, 2012.

(51) Int. Cl.
| | |
|---|---|
| *B01D 53/50* | (2006.01) |
| *B01D 53/68* | (2006.01) |
| *B01D 53/74* | (2006.01) |
| *B01J 20/22* | (2006.01) |
| *B01D 53/10* | (2006.01) |
| *B01J 20/04* | (2006.01) |
| *B01D 53/80* | (2006.01) |

(52) U.S. Cl.
CPC .............. *B01D 53/508* (2013.01); *B01J 20/223* (2013.01); *B01D 2253/304* (2013.01); *B01D 2258/0283* (2013.01); *B01D 53/10* (2013.01); *B01D 2257/2045* (2013.01); *B01D 2251/402* (2013.01); *B01J 20/043* (2013.01); *B01D 2253/112* (2013.01); *B01D 2251/404* (2013.01); *B01D 53/685* (2013.01); *B01D 53/80* (2013.01); *B01D 2257/302* (2013.01)

USPC .............. 423/240 R; 423/240 S; 423/243.08; 423/244.07; 422/168; 252/184; 252/189; 252/191; 252/183.13

(58) Field of Classification Search
USPC ................ 423/240 R, 240 S, 243.08, 244.07; 422/168; 252/184, 189, 191, 183.13
See application file for complete search history.

(56) References Cited

U.S. PATENT DOCUMENTS

| | | | |
|---|---|---|---|
| 3,900,504 | A | 8/1975 | Woerner |
| 4,020,180 | A | 4/1977 | Woerner |

(Continued)

FOREIGN PATENT DOCUMENTS

| | | |
|---|---|---|
| WO | 0216026 A2 | 2/2002 |
| WO | 2011143517 A1 | 11/2011 |

OTHER PUBLICATIONS

Srivastava, Ravi K., Controlling SO2 Emissions: A Review of Technologies; EPA/600/R-00/0093, Nov. 2000.

(Continued)

*Primary Examiner* — Timothy Vanoy
(74) *Attorney, Agent, or Firm* — Thaddius J. Carvis

(57) ABSTRACT

Dry processes, apparatus, compositions and systems are provided for reducing emissions of sulfur oxides, and sulfur dioxide in particular, and/or HCl in a process employing a combination of a dolomite hydrate sorbent and a sorbent doping agent administered to achieve coverage of a three-dimensional cross section of a passage carrying $SO_x$ and/or HCl —containing gases with a short but effective residence time at a temperature effective to provide significant sulfur dioxide and/or HCl reductions with high rates of reaction and sorbent utilization. The once-through, dry process can advantageously introduce the sorbent and sorbent doping agent dry or preferably as a slurry to enable uniform treatment. Preferred sorbent doping agents include water-soluble or water-dispersible copper and/or iron compositions which can be heated to an active form in situ by the flue gases being treated.

33 Claims, 2 Drawing Sheets

(56) References Cited

U.S. PATENT DOCUMENTS

| | | | |
|---|---|---|---|
| 4,061,716 A * | 12/1977 | McGauley | 423/244.06 |
| 4,081,253 A | 3/1978 | Marion | |
| 4,225,572 A * | 9/1980 | Shen et al. | 423/638 |
| 4,724,130 A | 2/1988 | Statnick et al. | |
| 4,755,499 A | 7/1988 | Neal | |
| 4,795,586 A | 1/1989 | Thompson et al. | |
| 4,980,138 A * | 12/1990 | Samish | 423/239.1 |
| 5,058,514 A * | 10/1991 | Mozes et al. | 110/345 |
| 5,114,898 A | 5/1992 | Pinnavaia | |
| 5,213,767 A * | 5/1993 | Smith et al. | 422/177 |
| 5,492,685 A | 2/1996 | Moran | |
| 5,520,898 A | 5/1996 | Pinnavaia | |
| 5,658,547 A | 8/1997 | Michalak et al. | |
| 6,281,164 B1 | 8/2001 | Demmel | |
| 6,453,830 B1 | 9/2002 | Zauderer | |
| 7,666,374 B2 | 2/2010 | Grochowski | |
| 2013/0294987 A1 * | 11/2013 | Smyrniotis et al. | 423/210 |

OTHER PUBLICATIONS

PCT Search Report, Jul. 2013.

* cited by examiner

DRY PROCESSES, APPARATUS, COMPOSITIONS AND SYSTEMS FOR REDUCING SULFUR OXIDES AND HCl

CROSS REFERENCE AND PRIORITY CLAIM

This application is claims priority to U.S. Provisional Patent Application No. 61/618,233, filed Mar. 30, 2012, the disclosure of which is incorporated herein by reference in its entirety.

FIELD OF THE INVENTION

The invention relates to dry processes, apparatus, compositions and systems for reducing emissions of sulfur oxides, and sulfur dioxide in particular, and HCl in a process employing a highly-effective combination of a sorbent and a sorbent doping agent administered to achieve coverage of the entire cross section of a passage carrying $SO_x$ and/or HCl-containing gases with a short but effective residence time at a temperature effective to provide significant sulfur dioxide and/or HCl reductions with high rates of reaction and sorbent utilization. The invention provides a once-through, dry process and can advantageously introduce the sorbent and sorbent doping agent as a slurry to enable uniform treatment.

BACKGROUND OF THE INVENTION

The problem of sulfur oxides has challenged combustion plant operators and regulators since there became an awareness of the harmful effects of acid rain. Sulfur oxides are formed during the combustion of sulfur-containing carbonaceous fuels and are referred to generally as $SO_x$ while comprising sulfur dioxide ($SO_2$) and sulfur trioxide ($SO_3$). The vast majority of $SO_x$ is present as $SO_2$. The $SO_3$ (as $H_2SO_4$) can, however, add to particulates emitted and can cause cold end corrosion. Accordingly, an effective system must address both $SO_2$ and $SO_3$. Ideally, the process should also address the problem of hydrochloric acid (HCl).

The art has provided a wide range of technologies. As a group, they can be called flue gas desulfurization technologies, FGD. See, for example, Srivastava, Ravi K.; *Controlling $SO_2$ Emissions: A Review of Technologies;* EPA/600/R-00/093, November 2000. These include both wet and dry technologies and can employ existing equipment, such as duct work, or provide separate reactors.

According to Srivastava, FGD technologies fall into two main categories: (1) once-through and (2) regenerable. In the former, the sorbent is discarded after use; and in the latter, the sorbent is regenerated after it has sorbed $SO_2$.

In once-through processes, sorbed $SO_2$ is bound by the sorbent and the sorbent is considered spent. The spent sorbents can be disposed of or recovered as a useful by-product, like gypsum, depending on quality and market factors.

Technologies considered regenerable can treat the sorbents to release the $SO_2$ and obtain useful products. After regeneration, the sorbent can be recycled for additional $SO_2$ scrubbing.

Each of the once-through and regenerable technologies can be further broken down as wet or dry. Wet processes produce a wet slurry waste or by-product, and scrubbed flue gas is saturated with water. The dry processes produce dry waste material, and scrubbed flue gas is not saturated.

The reader is referred to Srivastava, supra, for a closer view of the various technologies, where the authors group major FGD technologies into three major categories: (1) Wet FGD (composed of once-through wet FGD), (2) Dry FGD (composed of once-through dry FGD) and (3) Regenerable FGD (composed of wet and dry regenerable FGD)

The wet FGD processes can employ wet scrubbers, which typically employ large towers that cause contact between combustion flue gases and a slurry of calcium carbonate or the like that is sprayed countercurrently to the flue gas flow. Suitable chemical slurries can include calcium carbonate (limestone), lime (CaO in slurry as Ca$(OH)_2$), trona (sodium sesquicarbonate), sodium bicarbonate, dolomite, and the like, or blends of these materials. In limestone-based scrubbers, the $SO_x$ is captured to form $CaSO_3$, which is naturally oxidized in part or overtly oxidized to form gypsum ($CaSO_4$), which can be used commercially. Reaction between the $SO_x$ and the sorbent occurs in the liquid phase in a stirred tank over considerable time periods. Fuels high in chlorides will alter the chemical equilibrium in the liquid and can adversely affect scrubber efficiency. Quality and market conditions will dictate the value and fate of the spent sorbent. These wet scrubbers are expensive to install and operate and cannot be easily adapted to all plants.

The dry processes can introduce these same type of chemicals, either dry or as slurries that rapidly dry, into a flue gas stream in the furnace, a separate reactor or a duct or other passage carrying the flue gas, wherein the $SO_x$ is captured to some extent and can be disposed of in dry particulate form.

In one group of dry processes, a slurry is sprayed into a separate reactor—adapted from industrial spray driers—to cause intimate contact with the flue gases for moderate reaction times, e.g., ten seconds or more. These processes are quite effective, while not as effective as the wet scrubbers. They, however, are also capital intensive but cannot provide the high quality gypsum achievable by wet scrubbers.

In in-furnace sorbent injection, a dry sorbent is injected directly into the furnace in the optimum temperature region above the flame. As a result of the high temperature (e.g., on the order of 2000° F.), sorbent particles (e.g., often calcium hydroxide or calcium carbonate) decompose and become porous solids with high surface systems. Residence time is very short, on the order of a few seconds, and the sorbent particles are easily fouled before the chemical is fully utilized.

In-duct sorbent injection, like in-furnace sorbent injection, involves direct injection of sorbent into $SO_x$-containing gases. In these processes, the sorbent is introduced into a flue gas duct, but in contrast to spray drying, contact is made without the advantage of a large reaction vessel as used in spray dryers, and suffers from greatly diminished contact times, e.g., often only a few seconds. In-duct injection, typically uses an alkali metal or alkaline earth oxide or hydroxide, like trona, sodium carbonate, calcium hydroxide, magnesium hydroxide, dolomite, or the like, as outlined by Srivastava, supra, and U.S. Pat. No. 5,658,547 to Michalak, et al. U.S. Pat. No. 5,492,685 to Moran describes a hydrated lime having high surface area and small particle size prepared by hydrating lime with an aqueous hydration solution of an organic solvent, and preferably washing the resulting hydrate with an aqueous solution of an organic solvent prior to drying. The high surface area hydrates (e.g., up to 85 m$^2$/g) are sorbents for $SO_2$ removal from gas streams.

U.S. Pat. No. 5,658,547 to Michalak, et al., describes removing $SO_x$ and particulates from the combustion gases of a large boiler. In a primary treatment zone, a slurry comprising an alkaline $SO_x$-reducing composition and preferably a nitrogen-containing composition effective to reduce $NO_x$, is introduced into combustion gases at a temperature of from about 900° to about 1300° C. (about 165° to about 2375° F.). The gases are cooled by initial contact with steam-generating means, and then by contact with a gas-to-gas heat exchanger. Cooled gases are then subjected to a secondary treatment in which they are first humidified and further cooled by introduction of a water spray or aerosol to reduce the temperature to 100° C. (212° F.) or below. Contact between the $SO_x$-reducing composition and the humidified gas is maintained for a reaction period of at least two seconds. Particulate solids are then separated from the gases with a fabric filter. The cleaned gases are reheated by the gas-to-gas heat exchanger prior to discharge to the atmosphere.

These processes require feeding large quantities of these $SO_x$-reducing reagents, whether to the furnace or to back end duct work, and add significant solids to ash capture equipment and in some cases can degrade performance and cause operating and handling problems under certain conditions. There remains a need for a dry scrubbing process that can increase the sorbent utilization and removal efficiencies.

Other dry processes can include fluidized beds that provide longer reaction times. These processes are typically engineered to recirulate the sorbent for multiple passes with the combustion gases to enhance economy by increasing utilization of the sorbent. The sorbents for these processes are intended for recycling and are, therefore, more expensive to make and handle.

An example of these latter types of processes is seen from U.S. Pat. No. 4,755,499 to Neal, et al., which describes sorbents that are intended to be resistant to normal physical degradation which results from recurring adsorption and regeneration for use in a fluidized bed absorber. The sorbent is constructed of (a) an alumina substrate having a specified pore volume and (b) an alkali or alkaline earth component in defined amount relative to the substrate. Minor amounts of other metallic oxides can also be employed. The sorbents are manufactured to be regenerable and attrition resistant. They can be regenerated by heating in an inert atmosphere at temperatures up to about 350° C. and then reused.

In a related disclosure, U.S. Pat. No. 6,281,164, Demmel, et al., teach that the useful life of $SO_x$ additives having a $SO_2$ to $SO_3$ oxidation catalyst component and a $SO_3$ absorption component can be extended by employing each of these components as separate and distinct physical particles or pellets. The particles are prepared by spray drying or desiccation followed by calcination to produce microspheroidal particles having a range of sizes such that essentially all such particles will be retained by a Standard U.S. 200 mesh screen and essentially all particles will be passed by a Standard U.S. 60 mesh screen. Processing to reduce $SO_x$ entails capturing the $SO_x$ on the particles and then regenerating the particles for reuse. These particles are too expensive for once-through processes and are, in fact, too large to achieve good utilization in those processes.

Another example of regenerable sorbents is found in U.S. Pat. No. 5,114,898 to Pinnavaia, et al., which describes processes for removing noxious sulfur oxides from gas streams, particularly from flue gases of coal-burning power plants, using heated layered double hydroxide (LDH) sorbents. The sorbent compositions contain metal components, incorporated into the sorbents either by isomorphous replacement of all or part of $M^{11}$ and/or $M^{111}$ ions (the patent defining $M^{11}$ as a divalent metal and $M^{111}$ as a trivalent metal) in layers of LDH structures or by impregnation as a metal salt, to promote the oxidation of sulfur dioxide.

In another related teaching, U.S. Pat. No. 5,520,898 to Pinnavaia, et al., describes the use of base/clay composite materials as sorbents for the removal of $SO_x$ from flue gas streams. The composite contains a smectite clay and a sorbent component, such as alkaline earth metal hydroxides and carbonates, and a metal oxide or metal oxide precursor, preferably selected from transition metal ions. The smectite-type clays are said to serve as supports for the reactive base and as a dispersing agent for improved reactivities. The swelling properties of smectite clays are said to be responsible for higher reactivity of the sorbents. The injection of the sorbents into these, particularly to the boiler (700°-1000° C.), along with coal was considered.

There is a present need for technology that can improve on the capture of $SO_2$ and/or HCl in high percentages and in an economical manner in terms of material, equipment and disposal.

SUMMARY OF THE INVENTION

The present invention provides processes, apparatus, compositions and systems that will have a very positive effect on air quality by enabling reduction of $SO_x$ and HCl emissions at a very reasonable cost. The invention can be employed as a retrofit solution to existing plants and can be used in design of new plants.

In one aspect, the invention provides a process for reducing emissions of $SO_x$ and/or HCl from a combustor, comprising: identifying locations within a combustor for feeding a dolomite hydrate sorbent and a sorbent doping agent; determining the physical form and injection parameters for the sorbent and the sorbent doping agent; injecting both the dolomite hydrate sorbent and the sorbent doping agent into combustion gases containing $SO_x$ and/or HCl, the introduction being under conditions effective to capture sulfur oxides and/or HCl with the sorbent at a greater rate than achievable by the same sorbent without the sorbent doping agent; and collecting the spent sorbent.

In some embodiments the sorbent doping agents will comprise at least one member selected from the group of compositions comprising the sorbent doping agent comprises a copper composition selected from the group consisting of copper ammonium acetate, copper diammonium diacetate, copper ammonium triacetate, copper triammonium acetate, copper tetra ammonium sulfate, copper gluconate (and hydrates thereof), and mixtures of any of these. From another perspective, the doping agent can be a member selected from the group consisting of compositions defined by the formula $Cu(NH_3)_x(lower\ carboxylate)_y$, wherein the lower carboxylate is selected from the group consisting of formate, acetate and propionate, x is an integer from 0 to 4, y is an integer from 0 to 2, and x+y is equal to or greater than 1.

In embodiments of the invention, the doping agents will comprise the sorbent doping agent comprises an aqueous cuprammonium lower carboxylate complex of copper lower carboxylate and ammonium lower carboxylate.

In embodiments the doping agents will comprise an aqueous cuprammonium lower carboxylate complex of copper lower carboxylate and ammonium lower carboxylate containing weight proportions of about 13 parts of copper lower carboxylate as measured as the dihydrate to about 2 parts of ammonium lower carboxylate, and about 10 parts of 29 percent aqueous ammonia, said solution being at a pH in the range of about 7.1 to 7.4.

In embodiments the dolomite sorbent hydrate and the sorbent doping agent are injected by injection means comprising a plurality of nozzles within an introduction zone, and the nozzles are positioned to achieve at least 90% coverage within the introduction zone.

In another aspect, the invention provides an apparatus for reducing $SO_x$ and/or HCl in a gas stream, comprising: injection means positioned at locations on a passage for flue gases generated by the combustion of fuel, said injection means capable of feeding a dolomite hydrate sorbent and a sorbent doping agent at predetermined rates relative to a concentration of $SO_x$ and/or HCl in said flue gases, and said injection means further capable of introducing the dolomite hydrate sorbent and a sorbent doping agent in a predetermined physical form and with predetermined injection parameters for the sorbent and the sorbent doping agent including droplet size, momentum and concentration; whereby the dolomite hydrate sorbent with the sorbent doping agent captures sulfur oxides with high efficiency.

In another aspect, the invention provides system for reducing $SO_x$ and/or HCl in a gas stream, comprising: computer modeling means for identifying locations within a combustor and its duct work for feeding a dolomite hydrate sorbent and a sorbent doping agent and determining the physical form and injection parameters for the dolomite hydrate sorbent and the sorbent doping agent injection means positioned at locations on a passage for flue gases, said injection means capable of feeding a dolomite hydrate sorbent and a sorbent doping agent at predetermined rates relative to a measured concentration of $SO_x$ and/or HCl in said passage, and said injection means further capable of introducing the dolomite hydrate sorbent and a sorbent doping agent in a predetermined physical form and with predetermined injection parameters for the sorbent and the sorbent doping agent including droplet size, momentum and concentration; whereby the dolomite hydrate sorbent with the sorbent doping agent can have the characteristics specified below to capture sulfur oxides and/or HCl with high efficiency.

In yet another aspect, the invention provides compositions for reducing $SO_x$ and/or HCl in a gas stream, comprising: dolomite hydrate sorbent and a sorbent doping agent comprising copper and/or iron which will dehydrate and be caused to shatter into fine particles within the size range of from about 0.01 to about 0.2 microns upon introduction into a hot gas stream containing $SO_x$ and/or HCl, wherein the weight ratio (dry basis) of dolomite hydrate to sorbent doping agent is within the range of from about 100:1 to about 1:1 and the sorbent doping agent is selected from water-soluble or water-dispersible copper and/or iron compositions that release active copper or iron species when heated in situ by the flue gases being treated.

The invention provides several advantages compared with competitive processes, prominent among which are: treating flue gases to reduce $SO_x$ can also reduce HCl; sorbent material usage can be reduced due to sorbent utilization being more efficient; very high sulfur removal rates are enabled; simple equipment can be employed for retrofit.

Other preferred aspects and their advantages are set out in the description which follows.

BRIEF DESCRIPTION OF THE DRAWINGS

The invention will be better understood and its advantages will become more apparent when the following detailed description is read in conjunction with the accompanying drawings, in which.

DETAILED DESCRIPTION OF THE INVENTION

Figure 1:
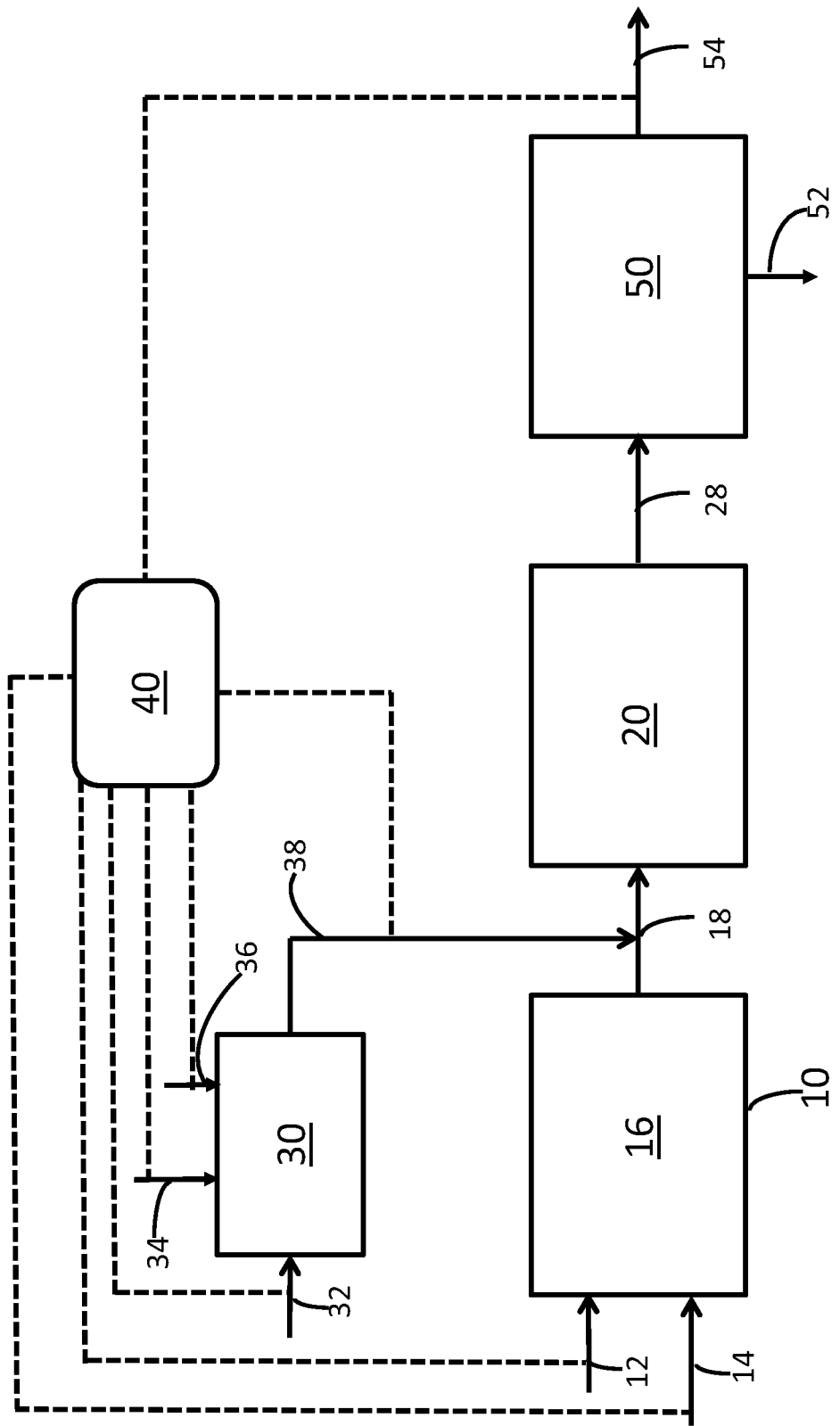
FIG. 1 is a flow diagram of one embodiment of the invention.

Reference will first be made to FIG. 1, which is a flow diagram of one embodiment of the invention. A combustor 10 can be of the type used for producing steam for electrical power generation, process steam, heating or incineration. It will be understood that other types of combustors can be employed to utilize the advantages of the invention. Unless otherwise indicated, all parts and percentages in this description are based on the weight of the materials at the particular point in processing or dry where that is indicated.

Coal is fed to the combustor 10 via line 12 and burned with air from line 14 in a combustion zone 16. It is an advantage of the invention that coal that is high in sulfur can be combusted with the resulting sulfur dioxides reduced. Advantageously, HCl can be reduced also. It will be understood that the principles of the invention can be applied to other carbonaceous fuels and fuel mixtures (any other fuel of choice, typically a carbonaceous thermal fuel or refuse).

Air for combustion, supplied by line 14, is preferably preheated by gas-to-gas heat exchangers (not shown) which transfer heat from ductwork (not shown) at the exit end of the combustion equipment, e.g., downstream of heat exchange section 20, where useful thermal energy is recovered from the combustor. Hot combustion gases flow through the combustor as indicated by arrow 18 and flow through heat exchanger section 20, which transfers heat from the combustion gases to water or steam for the generation of steam or super-heated steam. Other heat exchangers, including an economizer (downstream and not shown) may also be provided according to the design of the particular boiler.

Based on an extensive test program, it has been determined that many of the sorbent materials identified above and long associated in the art as effective for $SO_x$ reduction are far surpassed by a narrow group of combinations of sorbent and sorbent doping agents. The invention identifies dolomite hydrate (also called hydrated dolomite and dolomitic hydrated lime) of fine particle size and high surface area as a highly-effective sorbent when employed with a sorbent doping agent comprising a copper and/or iron composition.

The sorbent doping agent is employed as a water-soluble or water-dispersible composition of copper and/or iron (e.g., as a salt of copper and/or iron that can form the copper or iron oxide by heating in situ) that can be added to the dolomite hydrate sorbent for introduction into the flue gas to be treated. These sorbent doping agents release an active form, i.e., species, believed to be the oxides of copper and/or iron, in situ when heated by the flue gases being treated. The sorbent doping agent is typically employed (dry basis) at a rate of from about 1 to about 10 pounds per ton of fuel, with a narrower range being from about 2 to about 6 pounds per ton.

The sorbent doping agent will typically be employed with the dolomite hydrate sorbent at a weight ratio (dry basis) of dolomite hydrate to sorbent doping agent within the range of from about 100:1 to about 1:1. More preferred ratios will be within the range of from about 50:1 to about 5:2. Among the sorbent doping agents are iron salts such as iron nitrate and copper salts such as copper nitrate, those listed below, and especially those compositions described in U.S. Pat. Nos. 3,900,504 and 4,020,180 to Woerner, the disclosures of which are specifically incorporated herein by reference in their entireties.

In embodiments, sorbent doping agents can be water-soluble or water-dispersible copper and/or iron compositions which are believed to form copper and/or iron oxides when heated in situ by the flue gases being treated. Specifically referenced compositions are those described in U.S. Pat. No. 4,020,180 as comprising an aqueous cuprammonium lower carboxylate complex of copper lower carboxylate and ammonium lower carboxylate. Desirably in accord with U.S. Pat. No. 4,020,180, the complex will contain weight proportions of about 13 parts of copper lower carboxylate as measured as the dihydrate to about 2 parts of ammonium lower carboxylate, and about 10 parts of 29 percent aqueous ammonia, said solution being at a pH in the range of about 7.1 to 7.4.

In embodiments, doping agents according to the invention are highly soluble or dispersible in water and react with the hot combustion gases to result in compositions chemically different from when contacted with the combustion gases. Desirably, doping agent compositions include copper compositions that have copper that can be released in an active form at the temperatures involved to form a reactive copper entity. While it is theorized that the copper is oxidized to copper oxide, CuO, applicants do not want to be bound by a particular theoretical reaction.

Among the doping agents of interest to the invention are compositions that comprise copper and an ammonia moiety. Among these are ammonium copper compositions, including those having one or more copper atoms with one or more ammonium moieties. Water solubility or dispersibility is important because introducing them with water has been shown to be a highly-effective manner of achieving the necessary distribution followed by dissociation. Chemical dispersants and agitation can be employed as necessary.

In embodiments of the invention, the sorbent doping agents will comprise a copper composition selected from the group consisting of copper ammonium acetate, copper diammonium diacetate, copper ammonium triacetate, copper triammonium acetate, copper tetra ammonium sulfate, copper gluconate (and hydrates thereof), and mixtures of any of these. From another perspective, the doping agent can be a member selected from the group consisting of compositions defined by the formula $Cu(NH_3)_x(lower\ carboxylate)_y$, wherein the lower carboxylate is selected from the group consisting of formate, acetate and propionate, x is an integer from 0 to 4, y is an integer from 0 to 2, and x+y is equal to or greater than 1.

Closely related compositions and their hydrates as well other copper sources that exhibit similar efficacies in reacting with $SO_2$ and/or HCl can be employed. Copper compositions that contain no ammonium moiety, can be employed, but it is believed that these compositions will be facilitated in effectiveness by the presence of ammonia, such as a result of processing (e.g., for $NO_x$ reduction) or by supplementation as needed with ammonia or urea or other material effective to produce ammonia at the temperatures involved, as well as compounds equivalent in effect, e.g., ammines and their salts, urea breakdown products, ammonium salts of organic and inorganic acids, ammonium carbamate, biuret, ammelide, ammeline, ammonium cyanate, ammonium carbonate, ammonium bicarbonate; ammonium carbamate; triuret, cyanuric acid; isocyanic acid; urea formaldehyde; melamine; tricyanourea and mixtures and equivalents of any number of these.

Among copper containing doping agents not containing an ammonium moiety are copper acetylacetonate (and hydrates thereof), copper citrate (and hydrates thereof, e.g., hemipentahydrate), copper formate (and hydrates thereof), copper acetate monohydrate, copper nitrate (and hydrates thereof), copper 2,4-pentandionate (and hydrates thereof), copper sulfate (and hydrates thereof), copper gluconate (and hydrates thereof), copper soaps of fatty acids, and mixtures of any of these.

The dolomite hydrate sorbent will dehydrate and be caused to shatter in situ by the flue gases being treated and comprised of a hot gas stream containing $SO_x$, into fine particles within the size range of from about 0.01 to about 0.2 microns and containing the copper and/or iron oxides well dispersed therein.

Typically, the dolomite hydrate sorbent will be contacted with the hot flue gases containing $SO_x$ as a slurry with the sorbent doping agent, and the composition will dehydrate and be caused to shatter into fine particles (e.g., within the size range of from about 0.01 to about 0.2 microns) which based on modeling and proper placement of injectors and adjustment of droplet size, momentum and concentration prior to introduction, are dispersed over the cross section of the furnace section, duct or other apparatus where the flue gas is flowing. The dolomite hydrate can also be employed dry where this permits uniform distribution across the flow path of the flue gases being treated.

Preferred conditions will call for introducing the sorbent and doping agent using modeling techniques, such as computational fluid dynamics, which can be employed to initially determine the optimum locations (zones) to direct treatment chemicals within the boiler and/or ducts. Desirably, best sorbent and doping agent introduction will achieve essentially full coverage of the sorbent and doping agent across a three-dimensional section of a passage for the gases to be treated. Preferably, a number of nozzles will be spaced within the zones to achieve at least 90% coverage at the temperature necessary for reaction. This section can have a depth in the direction of flow as necessary to assure complete coverage from the sorbent and doping agent injectors used. In other words, the zone will preferably be of a depth in the direction of flow sufficient that each of the conical or like spray patterns from nozzles used to introduce the sorbent and doping agent will overlap with at least one other spray pattern, thereby providing sorbent and doping agent across the entire cross section of the zone. This three-dimensional section for treatment can be referred to as a defined introduction zone, and the aqueous sorbent and doping agent will be introduced into this zone under conditions effective for HCl and/or $SO_x$ emissions control. Following this zone (i.e., downstream of it) the combustion gases now having been treated with the sorbent and doping agent are discharged following sufficient reaction time to reduce the HCl and/or $SO_x$ concentration in the gases.

Dolomite hydrate sorbent, which has been found effective according to the invention for capturing $SO_x$ and/or HCl, is employed as dolomite hydrate and is preferably mixed with water to form a slurry with or without chemical stabilizers, to concentrations suitable for storage and handling, e.g., at least about 25%, and preferably at least about 40%, solids by weight. Preferred concentrations are within the range of from about 30 to about 50 weight %, e.g., from about 35 to about 45 weight %, based on the dry weight of the dolomite hydrate. The sorbent doping agent can be blended with the dolomite hydrate sorbent at any practical point prior to introduction into the hot combustion gases. In some cases it is introduced into the slurry tank or injection equipment directly before introduction into the flue gas being treated.

Reference is made to FIG. 1, which depicts a mixing stage 30 provided to prepare dolomite hydrate sorbent slurry, preferably in a form having high surface area, e.g., above about 100 $m^2$/gram (BET). For example, dolomite hydrate sorbent can be supplied via line 32, water can be supplied via line 34 and sorbent doping agent can be supplied via line 36. The sorbent slurry is typically characterized as containing from about 25 to about 45% dolomite hydrate solids by weight in water. Suitable stabilizers can be used to avoid the need for constantly stirring the tanks, but stirring is preferably provided. The material is further characterized by having a mass average particle size of from about 1 to about 5 microns (μ), e.g., nominally about 2 to 4 microns. An alternative scheme is shown in FIG. 2 wherein the sorbent doping agent can be added through 36' to a slurry of dolomite hydrate sorbent in line 38 and mixed by suitable means in the line. In all cases, the relative amounts of the materials and water can be controlled by a suitable controller 40; or batching and feed can be adjusted manually. Dotted lines in the drawings schematically designate control lines for proper communication between the various controlled lines and valves and the controller 40.

Preferred conditions will call for introducing the dolomite hydrate sorbent as a slurry incorporating the sorbent doping agent into a flue gas being treated. The flue gas will typically be at a temperature below about 2200° F. where treated, and will typically be within the range of from about 2100° to about 1500° F., preferably from about 1900° F. to about 1600° F. For HCl reduction, these temperatures are effective as are temperatures below 1600° F., e.g., typically lower than 900° F., say of from about 350° F. to about 700° F. that will also be effective. The slurry will typically be introduced as fine droplets having a mean diameter of from about 10 to about 350 microns, e.g., from about 50 to about 200 microns, so that the sorbent will be present for contact with the gas as fine particles of dolomite hydrate intimately mixed with the sorbent doping agent. Upon contact with the flue gas, the slurry will dry and, it is believed, will shatter to form ultra fine particles having a particle size of from about 0.01 to about 0.2 microns, e.g., about 0.02 to about 0.1 microns.

The feed rate of the dolomite hydrate sorbent can be established at any rate calculated to effectively reduce the concentration of $SO_x$ in the flue gas and will depend on the amount of fuel and its sulfur content. For coal having about 0.2 to about 3% sulfur, a feed rate of about 50 pounds of sorbent per ton of fuel will be an adequate starting point, with the exact feed rate to be determined based on experimentation. Typical feed rates will be within the range of from about 10 to about 100 pounds of dolomite hydrate (dry) per ton of fuel, and preferred rates will be within the range of from about 20 to about 90 pounds, e.g., 30 to about 70 pounds, of dolomite hydrate per ton of fuel. The dolomite hydrate will typically be employed at a weight ratio of dolomite hydrate to $SO_2$ in the flue gases of from about 0.15:1 to about 1.4:1. Preferred rates will be within the range of from about 0.45:1 to about 1.2:1.

Figure 2:
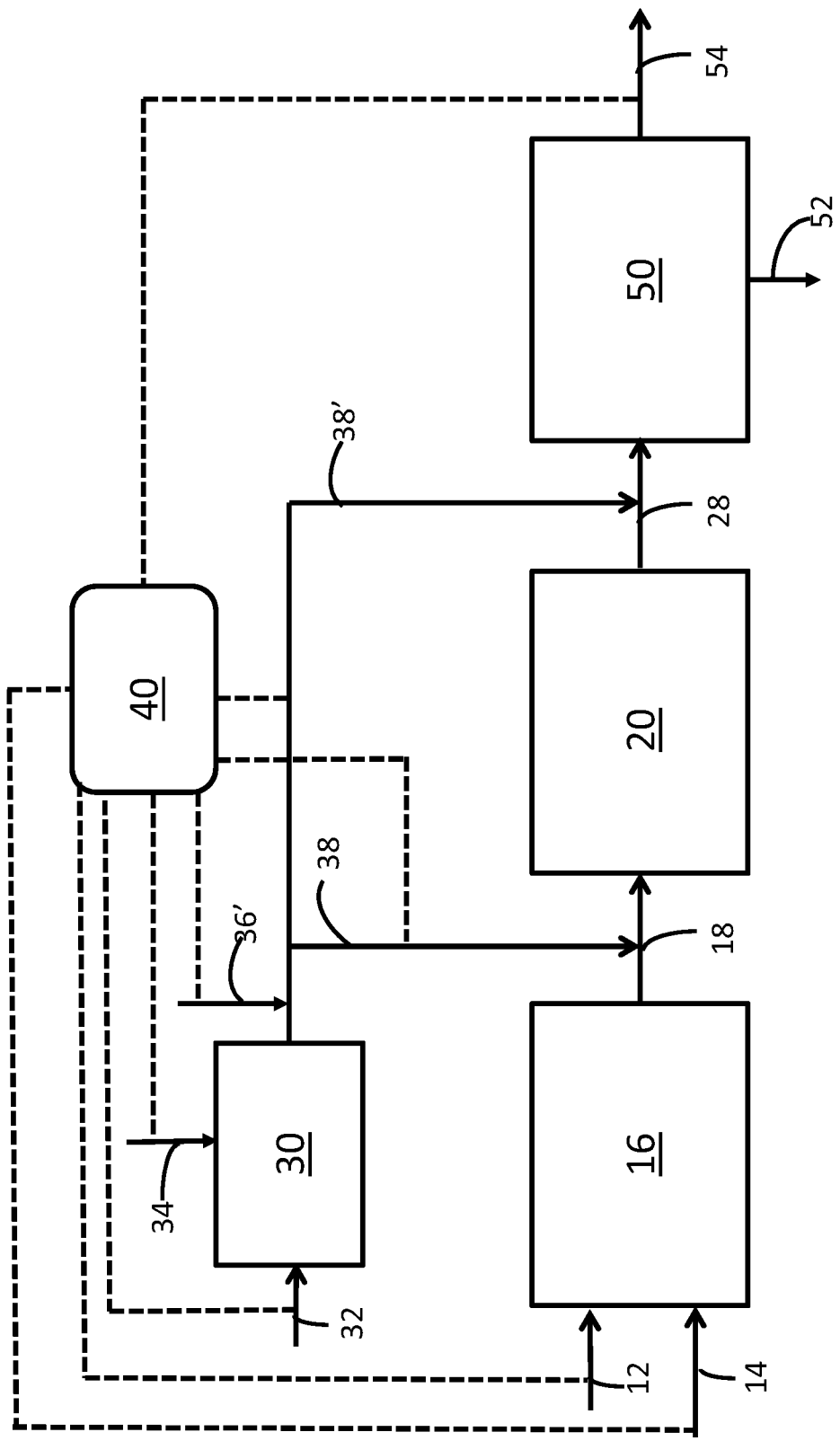
FIG. 2 is a flow diagram of another embodiment of the invention.

It is an advantage of the present invention that essentially complete coverage of the sorbent and doping agent is achieved in the combustion gases in an introduction zone at the temperature necessary for reaction. This section can have a depth in the direction of flow as necessary to assure complete coverage from the sorbent injectors used and will depend on the spray pattern of the injectors and the velocity of the gases. In one variation of the invention, the dolomite hydrate sorbent and the sorbent doping agent are introduced through separate injectors in proximity or in tandem such that the spray patterns of each pair of injectors (and there may be many across the section) overlap to at least some extent. Desirably, the invention will achieve full effect by modeling, e.g., by mechanical modeling or computational fluid dynamics using computer and data input means to identify locations within a combustor for feeding a dolomite hydrate sorbent and a sorbent doping agent and determine the physical form and injection parameters for the dolomite hydrate sorbent and the sorbent doping agent injection means positioned at locations, e.g., into line 18 in FIGS. 1 and 2, on a passage for flue gases from a combustor. Note that FIG. 2 shows additional or alternative introduction of slurry into line 28 via line 38' following heat exchange section 20, where the temperature will be lower, e.g., less than 900° F., e.g., within the range of from about 700° to about 200° F.

The invention will employ suitable injection means, such as nozzles (not shown) of the internal mix or external mix type, which can be (but don't have to be) air atomized and are capable of feeding a dolomite hydrate sorbent and a sorbent doping agent at a predetermined rate relative to a measured concentration of $SO_x$ in said passage. Internal mix nozzles capable of extremely fine droplet production are preferred. The injection means should be further capable of introducing the dolomite hydrate sorbent and a sorbent doping agent in a predetermined physical form and with predetermined injection parameters for the sorbent and the sorbent doping agent including droplet size, momentum and concentration.

Preferably, air-assisted atomizing nozzles are provided for introducing dolomite hydrate sorbent and sorbent doping agent into combustion gases prior to or flowing through heat exchanger section 20. The locations for the nozzles are preferably determined by computational fluid dynamics, by methodologies taught for example in U.S. Pat. Nos. 5,740,745 and 5,894,806, which are hereby incorporated by reference. The concentration and flow rates will be initially determined by modeling to assure that the proper amount of chemical is supplied to the correct location in the combustor in the correct physical form to achieve the desired results of reduced $SO_2$ and/or HCl.

Following introduction of the sorbent and sorbent doping agent, the gases are passed through particulate recovery means 50, which can include one or more of fabric filters and/or electrostatic precipitators. It is an advantage of the invention that because the combination of and sorbent doping agent is so effective at removing $SO_x$, after contact times of less than 3 seconds, that the added reaction time provided by a fabric filter is not essential as it is to lesser active sorbent treatments of the prior art. Solids can be recovered via line 52, and flue gas can be exhausted via line 54.

The following examples are presented to further explain and illustrate the invention and are not to be taken as limiting in any regard. Unless otherwise indicated, all parts and percentages are by weight.

EXAMPLE 1

This example describes the introduction of an array of $SO_x$-reducing sorbents that the prior art has identified as having utility along with compositions according to the invention.

A laboratory pilot plant scale combustor is employed for a series of tests. The combustor was a vertical, up-fired, 28-foot high cylinder, with an inner diameter of 3.5 feet, which allowed gas velocities of 10 to 20 feet per second and residence times of 1.3 to 2.5 seconds, depending upon the firing rate. The design furnace exit gas temperature was 2200° F.

The body of the furnace was built of seven four-foot tall sections, each being a water-cooled jacket with four inches of cast refractory lining the fireside. The refractory lining limited the heat extraction to ensure the proper simulation of the radiation environment found inside full-scale furnaces.

The burner was mounted coaxially on the bottom of the furnace and is up-fired using natural gas for preheating and pulverized coal for the tests. It was equipped with a flow control system for secondary air flow and a set of registers, which impart swirl to the secondary air, separate from the flow control. The secondary air and the primary air-coal mixture enter the furnace through a refractory quad with a 25° half angle. Two clean-out ports are provided in this section, to allow bottom ash to be periodically removed from the furnace.

The combustion gases exited the vertical furnace through a horizontal convection pass, which is designed to remove a substantial part of the heat from the flue gas. The extraction of heat was designed to simulate the time-temperature profile found in a utility boiler. A series of three air-cooled tube banks was installed in the convective pass, and the air cooling was used to control either the temperature profile of the flue gas or the tube metal surface temperatures for fouling/ash deposition studies. A crossflow tubular air preheater followed the convective tube banks and is used to preheat the primary and secondary air. Finally, four tube-in-shell recuperators were used to cool the flue gas down to a nominal 300° F.

The convective section is 1.5 feet×1.5 feet×22 feet, providing gas velocities of 30 to 60 feet per second and residence times of 0.4 to 0.8 seconds, again depending upon the firing rate. The design temperature range for the convective section is 2200 to 1200° F.

A complete-extractive, continuous, emissions-monitoring (CEM) system was interfaced with a computer control system. The combustor was operated at about 3.4 MMBTU/hr, with a typical combustor excess $O_2$ level of 3%. The combustor has excess $O_2$ measured at the exit for control, and a flue gas measurement just prior to exiting to the stack for monitoring of other off-gasses, including $O_2$, CO, $CO_2$, NO, and $SO_2$. Additionally, a Fourier Transform Infrared Spectroscopy (FTIR) analyzer was utilized to monitor other gases, including $CH_4$, CO, $CO_2$, $H_1O$, $H_2S$, $H_2SO_4$, HCl, HF, HBr, $N_2O$, $NH_3$, NO, $NO_2$, $SO_2$ and $SO_3$.

The combustor had several ports capable of injecting wet or dry material. The locations include below and above the fireball, middle, and near exit. Injection was capable of upward (co-current) and downward (counter-current) flow. This example utilized dry injection directed downwardly, counter to the up-flowing combustion gases.

Compositions prepared for the present evaluation included ten sorbent base materials, all available commercially, plus a series of formulations in which the base materials were reacted, mixed or impregnated with various doping agents. The listing of formulations used is shown in Table 1 for sorbents and Table 2 for sorbent doping agents, below. The nomenclature used in the reporting includes the base material designation, a hyphen, and then the doping agent. For example, Dolomitic hydrated lime (dolomite hydrate sorbent) has a designation of "DL". When treated with copper diammonium diacetate sorbent doping agent, designation "3", the formulation carries a sample ID of "DL-3". Also included are the as-received particle size ($D_{50}$ weight average) and surface area (BET) properties of each material.

TABLE 1

| Compound | Chemical Formula | Designation | PSD d50 | Surface area, $m^2/g$ |
|---|---|---|---|---|
| Dolomitic Hydrated Lime | $Ca(OH)_2 \cdot Mg(OH)_2$ | DL | 8, 9, 14 | 109, 113, 113 |
| Calcium Carbonate | $CaCO_3$ | CC | 10, 13, 14 | 1, 1, 2 |
| Sorbacal H* (Calcium Hydroxide) | $Ca(OH)_2$ | CHHP | 2.67 | 20-23 |
| Calcium Hydroxide | $Ca(OH)_2$ | CNN | 19 | 33 |
| Bonito | $Al_{12}CaO_{19}$ | CAB | 5, 5, 6 | 46-47 |
| CA-47071 Cement Aggregate | $CaO \cdot Al_2O_3$ | CAC | 9, 11, 12 | 46, 47, 49 |
| Utilimag 40 (Magnesium Oxide) | MgO | MO | | 45 |
| Manganese Dioxide HAS | $MnO_2$ | MDH | 3.0 to 5.5 | 200-270 |
| Manganese Dioxide HPX | $MnO_2$ | MDX | 3-8 | TBD |

TABLE 1-continued

| Compound | Chemical Formula | Designation | PSD d50 | Surface area, $m^2/g$ |
|---|---|---|---|---|
| CAT-AID | Mg—Ca Mixed Oxide | CA | 38 | 61 |

TABLE 2 for sorbent doping agents

| Metal (Doping Agents) | | Designation |
|---|---|---|
| Iron Nitrate | $Fe(NO_3)_3$ | 1 |
| Iron Oxide | $Fe_2O_3$ | 2 |
| Ammonium Copper Acetate | C2H7CuNO2 | 3 |
| Copper Nitrate | CuNO3 | 4 |

The doped materials were impregnated with an aqueous based solution containing the dopant, or physically mixed with the base sorbent. Details on composition of most of the mixtures are shown in the following Tables 3-1 and 3-2:

TABLE 3-1

$Fe_2O_3$ Dosing

| Name | Final Fe wt % |
|---|---|
| CHHP2 | 1.5 |
| MDX2 | 1.5 |

TABLE 3-2

$Fe(NO_3)_3$ Dosing

| Name | Fe wt % | Added Moist % | $Fe(NO_3)_3$ Solution wt % | $Fe(NO_3)_3$ Solution Added (kg) |
|---|---|---|---|---|
| MDH1 | 1.50 | 11.27 | 43.48 | 2.831 |
| DL1 Clumpy | 0.72 | 4.25 | 55.16 | 1.076 |
| DL1 | 0.14 | 0.82 | 55.16 | 0.207 |
| CHHP1 | 0.81 | 4.73 | 55.16 | 1.200 |
| CC1 Clumpy | 0.24 | 1.62 | 55.16 | 0.410 |

A rotary mixer was typically utilized to prepare the compositions, while liquid solutions were applied with a spraying system in a slow, controlled manner as to minimize agglomeration.

Addition of the sorbents to the combustor (with or without doping agent) was accomplished via dry injection. The combined sorbent and sorbent doping agents were introduced into the combustion gases as-is in that no additional drying was performed on the mixture materials.

The samples were added to a rotary screw feeder which had been previously calibrated for addition rate of each material. The screw feeder exited into the entry of an eductor system which injected directly into the desired entry point of the combustor or downstream flue. In the present study, dry injection was performed into a port above the fire ball in the combustor where the temperature was about 2000°±100° F., with injector facing upward.

Additionally, candidate materials were injected into the flue, near the heat exchangers, where the typical temperature is 385° F. Injection rates were selected from 3, 6, 9, 18 pounds per hour (lbs/hr), and maximum flow rate for each material.

Depending on the density of the material, the maximum rate varied, from 9 to 10 up to 20 lbs/hr. During select time periods, a flue gas isokinetic particulate sample was obtained. The procedure uses "Method 17" (40 CFR 60. Appendix A to Part 60) as the basis for collection, but the process is modified to ideally collect the particulate sample only. Typically, 30-60 minutes was required to collect sufficient sample for further analysis.

We have reviewed all of the data taken and believe that the following conclusions the and observations are borne out by the data:

a. All the grades (and their enhanced blends) of calcium aluminate, cement aggregate, magnesium hydroxide, many of the grades of calcium carbonate (except for one test), Trona (sodium sesquicarbonate) and manganese dioxide did little in the way of reductions (<20%). Unlike everything else tested in the furnace, Trona was tested at 350° F. and 500° F. due to temperature stability limitations.

b. The calcium hydroxides and their enhanced mixtures fared better at 20 to 40% reductions.

c. One combination exceeded the performance of all the others, both wet (slurry) and dry-dolomite hydrate and copper ammonium acetate; the CAA (copper ammonium acetate) being fed at a ratio of from 1-6% of the mass of the dolomite hydrate.

d. Two of the three highest performers in terms of $SO_2$ reduction were a blend of dolomite hydrate and copper ammonium acetate, with the highest performance seen by the dry materials and their blends being the dolomite hydrate-CAA blend at 91% reduction in $SO_2$. This is well beyond what any other sorbent or sorbent blend tried in the complete battery of tests was able to generate, yielding an unexpected result.

e. The three top performers were all dolomite hydrate-CAA blends at various dosages of chemical. The highest performer was the same blend at 75% reduction in $SO_2$. Again, no other slurried blend performed as well, which was also an unexpected result.

f. The dolomite hydrate plus iron nitrate, copper nitrate and magnetite blends all produced reasonable reductions (~50%), but not as good as the dolomite CAA blends.

g. Prior tests showed that a high quality lime, fed at up to 300 pounds/ton of fuel, yielded not only lower reductions (~65%) in $SO_2$ than the top performing blends discussed here, but also had relatively inefficient $SO_3$/CaO ratios that were more similar to baseline chemistry measurements. This is all the more remarkable considering that the dolomite hydrate CAA blend tests were at one-third to one-half the dosage of the other calcium based sorbents.

h. The enhanced $SO_3$/CaO ratio was observed in the high performing formulations, namely that of dolomitic lime hydrate and CAA. In the below table (FIG. 5), the high performing lime sample from the earlier trial is included as a comparison of the chemistry. This comparative data shows the relative inefficiency of the calcium conversion in the lime, in which the $SO_3$/CaO ratio is just 0.64, a value similar to the base case. XRD data confirmed a significant amount of unreacted CaO was present in the fly ash samples.

i. The results of chemical analysis using X-Ray Diffraction compared to X-Ray Flourescence, shows very good linearity, indicating that both test methods track well in measuring what the end results of the tests show. In general, the lower the level of unreacted calcium oxide in the ash sample, the more efficient the process is. The high performing combination of dolomitic lime hydrate and copper ammonium acetate (CAA) had essentially no unreacted calcium oxide present, and had the highest levels, on average of calcium sulfate present in the ash.

The above description is for the purpose of teaching the person of ordinary skill in the art how to practice the invention. It is not intended to detail all of those obvious modifications and variations, which will become apparent to the skilled worker upon reading the description. It is intended, however, that all such obvious modifications and variations be included within the scope of the invention which is defined by the following claims. The claims are meant to cover the claimed components and steps in any sequence that is effective to meet the objectives there intended, unless the context specifically indicates the contrary.

The invention claimed is:

1. A process for reducing emissions of $SO_x$ and/or HCl from a combustor, comprising: identifying locations within a combustor for feeding a dolomite hydrate sorbent and a sorbent doping agent; determining the physical form and injection parameters for the sorbent and the sorbent doping agent; injecting both the dolomite hydrate sorbent and the sorbent doping agent with water into combustion gases containing $SO_x$ and/or HCl, the introduction being under conditions effective to capture sulfur oxides and/or HCl with the sorbent at a greater rate than achievable by the same sorbent without the sorbent doping agent; and collecting the spent sorbent.

2. A process according to claim 1, wherein the sorbent is introduced at a temperature within the range of from about 2200° to 1500° F. as a slurry in droplets having a mean diameter of from about 25 to about 300 microns.

3. A process according to claim 2, wherein the sorbent is introduced at a temperature within the range of from 1900° to about 1600° F.

4. A process according to claim 1, wherein the sorbent is introduced to reduce HCl at a temperature of less than about 1600° F.

5. A process according to claim 1, wherein the sorbent is introduced to reduce HCl at a temperature lower than 900° F.

6. A process according to claim 1, wherein the sorbent is introduced a as droplets having a mean diameter of from about 25 to about 350 microns.

7. A process according to claim 1, wherein the sorbent is introduced at feed rates within the range of from about 25 to about 100 pounds of dolomite hydrate per ton of fuel.

8. A process according to claim 1, wherein the dolomite hydrate is employed at a weight ratio of dolomite hydrate to weight of $SO_2$ in the flue gases of from about 0.15:1 to about 1.4:1.

9. A process according to claim 1, wherein the sorbent doping agent will be employed with the dolomite hydrate sorbent at a weight ratio (dry basis) of dolomite hydrate to sorbent doping agent within the range of from about 100:1 to about 1:1.

10. A process according to claim 1, wherein the sorbent doping agent is a water-soluble or water-dispersible composition of copper and/or iron.

11. A process according to claim 1, wherein the sorbent doping agent comprises a copper composition selected from the group consisting of copper ammonium acetate, copper diammonium diacetate, copper ammonium triacetate, copper triammonium acetate, copper tetra ammonium sulfate, copper gluconate (and hydrates thereof), and mixtures of any of these.

12. A process according to claim 1, wherein the sorbent doping agent comprises an aqueous cuprammonium lower carboxylate complex of copper lower carboxylate and ammonium lower carboxylate.

13. A process according to claim 1, wherein the sorbent doping agent comprises an aqueous cuprammonium lower carboxylate complex of copper lower carboxylate and ammonium lower carboxylate containing weight proportions of about 13 parts of copper lower carboxylate as measured as the dihydrate to about 2 parts of ammonium lower carboxylate, and about 10 parts of 29 percent aqueous ammonia, said solution being at a pH in the range of about 7.1 to 7.4.

14. A process according to claim 1, wherein the sorbent doping agent comprises a member selected from the group consisting of: copper acetylacetonate and hydrates thereof, copper citrate and hydrates thereof, copper formate and hydrates thereof, copper acetate monohydrate, copper nitrate and hydrates thereof, copper 2,4-pentandionate and hydrates thereof, copper sulfate and hydrates thereof, copper gluconate and hydrates thereof, copper soaps of fatty acids, and mixtures of any of these.

15. A process according to claim 1, wherein the sorbent doping agent comprises copper diammonium diacetate.

16. A process according to claim 1, wherein the sorbent doping agent comprises a copper ammonium complex having an empirical formula of $C_2H_7CuNO_2$.

17. A process according to claim 1, wherein the sorbent is injected as a slurry containing from about 25 to about 45% dolomite hydrate solids by weight in water.

18. A process according to claim 1, wherein the sorbent has a mass average particle size of from about 1 to about 5 microns (μ).

19. A process according to claim 1, wherein the dolomite hydrate sorbent is preferably mixed with water to form a slurry at a concentration of at least about 25% solids by weight.

20. A process according to claim 1, wherein the dolomite sorbent hydrate and the sorbent doping agent are injected by injection means comprising a plurality of nozzles within an introduction zone, and the nozzles are positioned to achieve at least 90% coverage within the introduction zone.

21. An apparatus for reducing $SO_x$ and/or HCl in a gas stream, comprising: injection means positioned at locations on a passage for flue gases generated by the combustion of fuel, said injection means capable of feeding a dolomite hydrate sorbent and a sorbent doping agent at predetermined rates relative to a concentration of $SO_x$ and/or HCl in said flue gases, and said injection means further capable of introducing the dolomite hydrate sorbent and a sorbent doping agent with water in a predetermined physical form and with predetermined injection parameters for the sorbent and the sorbent doping agent including droplet size, momentum and concentration; whereby the dolomite hydrate sorbent with the sorbent doping agent captures sulfur oxides with high efficiency.

22. An apparatus according to claim 21, wherein the injection means comprise a plurality of nozzles within an introduction zone and the nozzles are positioned to achieve at least 90% coverage within the introduction zone.

23. A system for reducing $SO_x$ and/or HCl in a gas stream, comprising: computer modeling means for identifying locations within a combustor and its duct work for feeding a dolomite hydrate sorbent and a sorbent doping agent and determining the physical form and injection parameters for the dolomite hydrate sorbent and the sorbent doping agent injection means positioned at locations on a passage for flue gases, said injection means capable of feeding a dolomite hydrate sorbent and a sorbent doping agent at predetermined rates relative to a measured concentration of $SO_x$ and/or HCl in said passage, and said injection means further capable of introducing the dolomite hydrate sorbent and a sorbent doping agent with water in a predetermined physical form and with predetermined injection parameters for the sorbent and the sorbent doping agent including droplet size, momentum and concentration; whereby the dolomite hydrate sorbent with the sorbent doping agent can have the characteristics of any of claims 6-20 to capture sulfur oxides and/or HCl with high efficiency.

24. A composition for reducing $SO_x$ and/or HCl in a gas stream, comprising: dolomite hydrate sorbent and a sorbent doping agent comprising copper and/or iron which will dehydrate and be caused to shatter into fine particles within the size range of from about 0.01 to about 0.2 microns upon introduction into a hot gas stream containing $SO_x$ and/or HCl, wherein the weight ratio (dry basis) of dolomite hydrate to sorbent doping agent is within the range of from about 500:1 to about 25:1 and the sorbent doping agent is selected from water-soluble or water-dispersible copper and/or iron compositions that release active species when heated in situ by the flue gases being treated.

25. A composition for reducing $SO_x$ and/or HCl in a gas stream, comprising: dolomite hydrate sorbent and a sorbent doping agent comprising copper and/or iron having characterizing features described in any of claims 6-20.

26. A process according to claim 1, wherein the sorbent doping agent comprises a member selected from the group consisting of compositions defined by the formula $Cu(NH_3)_x$ (lower carboxylate)$_y$, wherein the lower carboxylate is selected from the group consisting of formate, acetate and propionate, x is an integer from 0 to 4, y is an integer from 0 to 2, and x+y is equal to or greater than 1.

27. A process for reducing emissions of $SO_x$ and/or HCl from a combustor, comprising: introducing a dolomite hydrate sorbent and a sorbent doping agent into combustion gases containing $SO_x$ and/or HCl, the introduction being under conditions effective to capture sulfur oxides and/or HCl with the sorbent at a greater rate than achievable by the same sorbent without the sorbent doping agent; and collecting the spent sorbent; wherein introduction is at a temperature within the range of from about 2200° to 1500° F. as a slurry in droplets having a mean diameter of from about 25 to about 300 microns.

28. A process for reducing emissions of $SO_x$ and/or HCl from a combustor, comprising: introducing a dolomite hydrate sorbent and a sorbent doping agent into combustion gases containing $SO_x$ and/or HCl, the introduction being under conditions effective to capture sulfur oxides and/or HCl with the sorbent at a greater rate than achievable by the same sorbent without the sorbent doping agent; and collecting the spent sorbent; wherein the introduction is at a temperature within the range of from 1900° to about 1600° F.

29. A process for reducing emissions of $SO_x$ and/or HCl from a combustor, comprising: introducing a dolomite hydrate sorbent and a sorbent doping agent into combustion gases containing $SO_x$ and/or HCl, the introduction being under conditions effective to capture sulfur oxides and/or HCl with the sorbent at a greater rate than achievable by the same sorbent without the sorbent doping agent; and collecting the spent sorbent; wherein the introduction is to reduce HCl at a temperature of less than about 1600° F.

30. A process for reducing emissions of $SO_x$ and/or HCl from a combustor, comprising: introducing a dolomite hydrate sorbent and a sorbent doping agent into combustion gases containing $SO_x$ and/or HCl, the introduction being under conditions effective to capture sulfur oxides and/or HCl with the sorbent at a greater rate than achievable by the same sorbent without the sorbent doping agent; and collecting the spent sorbent; wherein the sorbent is introduced to reduce HCl at a temperature lower than 900° F.

31. A process for reducing emissions of $SO_x$ and/or HCl from a combustor, comprising: introducing a dolomite hydrate sorbent and a sorbent doping agent into combustion gases containing $SO_x$ and/or HCl, the introduction being under conditions effective to capture sulfur oxides and/or HCl with the sorbent at a greater rate than achievable by the same sorbent without the sorbent doping agent; and collecting the spent sorbent; wherein the sorbent is introduced as droplets having a mean diameter of from about 25 to about 350 microns.

32. A process for reducing emissions of $SO_x$ and/or HCl from a combustor, comprising: introducing a dolomite hydrate sorbent and a sorbent doping agent into combustion gases containing $SO_x$ and/or HCl, the introduction being under conditions effective to capture sulfur oxides and/or HCl with the sorbent at a greater rate than achievable by the same sorbent without the sorbent doping agent; and collecting the spent sorbent; wherein the sorbent is introduced at feed rates within the range of from about 25 to about 100 pounds of dolomite hydrate per ton of fuel.

33. A process for reducing emissions of $SO_x$ and/or HCl from a combustor, comprising: introducing a dolomite hydrate sorbent and a sorbent doping agent into combustion gases containing $SO_x$ and/or HCl, the introduction being under conditions effective to capture sulfur oxides and/or HCl with the sorbent at a greater rate than achievable by the same sorbent without the sorbent doping agent; and collecting the spent sorbent; wherein the dolomite hydrate is employed at a weight ratio of dolomite hydrate to weight of $SO_2$ in the flue gases of from about 0.15:1 to about 1.4:1.

* * * * *